J. LINES.
AUTO ATTACHMENT.
APPLICATION FILED AUG. 17, 1917.
1,336,305.
Patented Apr. 6, 1920.
2 SHEETS—SHEET 1.
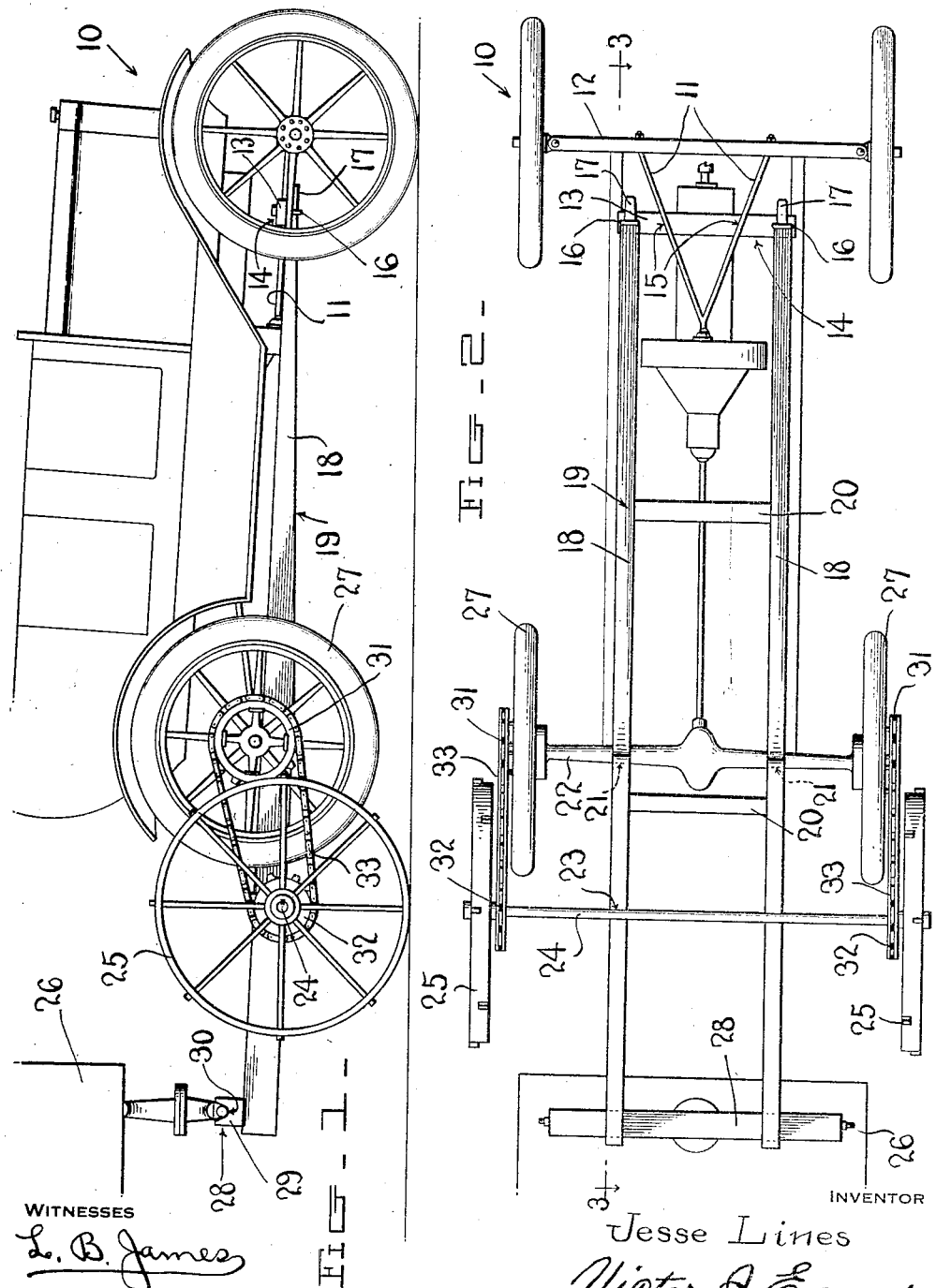
INVENTOR
Jesse Lines
BY Victor J. Evans
ATTORNEY
WITNESSES
L. B. James

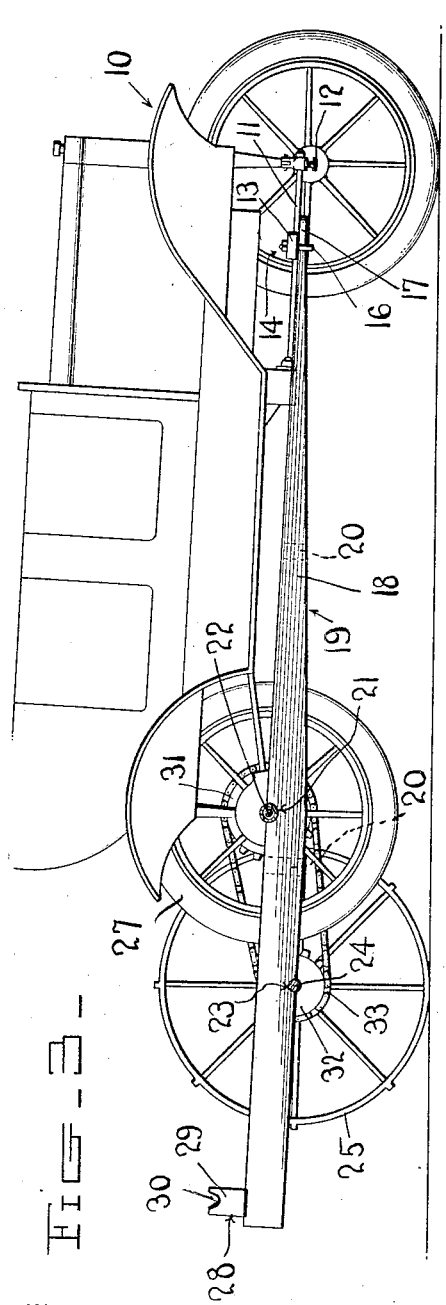
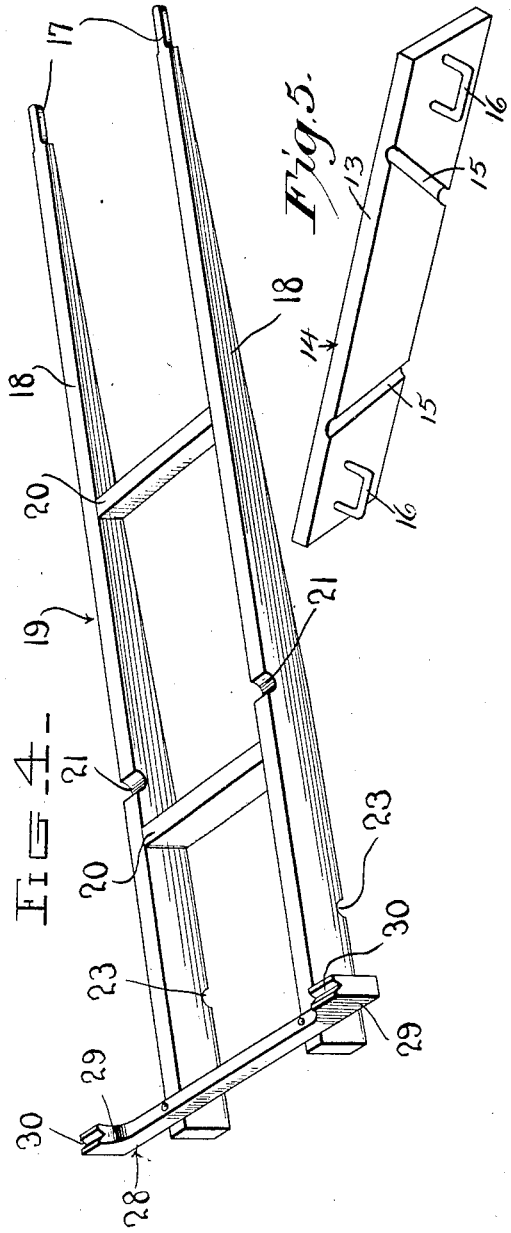

UNITED STATES PATENT OFFICE.

JESSE LINES, OF SABETHA, KANSAS.

AUTO ATTACHMENT.

1,336,305.   Specification of Letters Patent.   Patented Apr. 6, 1920.

Application filed August 17, 1917. Serial No. 186,769.

*To all whom it may concern:*

Be it known that I, JESSE LINES, a citizen of the United States, residing at Sabetha, in the county of Nemaha and State of Kansas, have invented new and useful Improvements in Auto Attachments, of which the following is a specification.

This invention relates to improvements in means for converting an automobile of the Ford construction into a farm tractor.

In carrying out my invention, it is my purpose to produce a frame of a novel and peculiar construction, which may be readily positioned on an automobile of or similar to the Ford construction and which will so engage with the parts thereof as to be effectively secured to the said automobile without the employment of other attaching means, the said frame being also provided with means whereby to engage with an axle of a wheeled truck, the wheels of the said truck being of a greater diameter than the propelling wheels of the automobile, so that the said propelling wheels will be elevated when the device is applied to the machine, while propelling means is hitched between the drive wheels of the automobile and the wheels of the tractor.

It is also my object to produce a frame readily applicable to or removable from a wheeled frame or chassis of an automobile, the wheels of the said frame receiving a momentum from the driving power of the automobile, and wherein the construction shall be simple, cheap, and thoroughly effective.

Other objects and advantages will present themselves as the nature of the invention is more fully understood, reference being had to the accompanying drawings, in which, Figure 1 is a side elevation illustrating an ordinary automobile transformed into a farm tractor in accordance with the present invention.

Fig. 2 is an inverted plan view of the same.

Fig. 3 is a sectional view approximately on the line 3—3 of Fig. 2.

Fig. 4 is a perspective view of the frame of the improvement.

Fig. 5 is a perspective view of the bracket.

In the Ford construction of automobiles the front axle is braced by an angle bar or rod that has its inner end connected, by a ball and socket connection to the casing of the engine of the automobile. On the angular arms of the front radius bar 11 of the machine 10 I position the block-shaped body 13 of a bracket 14. The body 13, upon its under face is provided with spaced angular grooves or depressions 15 receiving the said angular arms of the radius bar 11. The grooves are of a sufficient depth to wholly receive the angle arms of the bar so that when the bracket is thus arranged the same will be held against longitudinal as well as lateral movement. Upon the portions of the body extending outwardly of the said depressions 15, to the opposite sides of the angular arms of the rod 11, the body 13 of the bracket, upon the under face thereof is formed or otherwise provided with depending substantially U-shaped members or yokes 16 and these yokes are designed to receive the inner ends 17 of the side members or arms 18 of the frame 19 of my improvement. The side members are, at spaced intervals connected by transverse blocks 20, and the said blocks may be suitably reinforced, said reinforcements also connected with the inner surface of the sides 18 of the frame.

The sides 18 of the frame 19 upon their upper edges are provided with alining notches 21 to receive therein the rear axle 22 of the automobile 10, and the said side members of the frame, to the rear of the notches 21 have their under faces or edges provided with additional alining notches 23 designed to receive the shaft or axle 24 upon which are journaled the wheels 25 of the tractor. The axle 24 and the wheels 25 journaled thereon may be and preferably are removed from the front of an ordinary farm wagon 26, the said wheels 25 being of a greater diameter than the rear or propelling wheels 27 of the automobile 10 so that when the device is arranged upon the automobile, the said wheels 27 will be elevated above the ground surface. The frame, at the outer or rear end thereof, is provided with a bolster member 28 secured to the sides 18 in any desired or preferred manner and serving, in addition to a purpose which will presently be described, means for reinforcing and properly retaining the sides 18 in spaced condition. The bolster 28, at the opposite corners thereof, is formed with outwardly extending members 29, each of which has its outer surface notched as at 30, whereby to receive therein the front axle of the farm wagon 26, when the said axle and wheels are not removed from the said wagon, or to receive the front bolster of the said wagon, when the axle and front wheels are removed, as illustrated in Fig. 1 of the drawings. When the arms of the frame are received in the yokes of the bracket, the rear axle 23 in the notches 21, and the axle 24 for the wheels 25 in the notches 23, it will be noted that the frame 19 is effectively sustained upon both the automobile and the axle of the tractor wheels, no securing devices such as hooks, bolts, etc., being required. The bracket 13 is subject to practically no strain. The weight of the wagon 26 being delivered to the rear of the frame 19, is divided between the bearing portions of the frame for the axle 24 of the tractor wheels 25 and the axle 22 of the rear drive wheels of the automobile.

To the hubs of the wheels 27 are secured toothed wheels 31, and to the hubs of the wheels 25 are likewise secured toothed wheels 32, and around these toothed wheels 31 and 32 are trained endless sprocket chains 33, whereby a momentum imparted to the wheels 27 from the engine of the automobile will be directed to the tractor wheels 25.

It is, of course, to be understood that in lieu of the farm wagon any desired farm implement may be hitched to the frame, and from the foregoing description, when taken in connection with the drawings, the simplicity and advantages of the construction, will, it is thought, be apparent without further detailed description, it being thought merely necessary to add that the frame and bracket may be applied to or removed from the automobile in an expeditious manner and that no bolts or similar securing elements are required in attaching the frame to the said automobile.

Having thus described the invention, what I claim is:

In a means for converting an automobile into a tractor, the combination with the angle radius bar for the front axle of an automobile, of a bracket arranged on the radius bar having angularly arranged depressions in the under face thereof receiving therein angle irons of the radius bar, and depending yokes adjacent the ends thereof, and said yokes designed to receive therein the ends of a wheeled frame which is adapted to underlie the rear axle of the automobile and to elevate the wheels thereof.

In testimony whereof I affix my signature.

JESSE LINES.